United States Patent

[11] 3,599,432

[72] Inventor Peter H. Ellis
Chula Vista, Calif.
[21] Appl. No. 25,133
[22] Filed Apr. 2, 1970
[45] Patented Aug. 17, 1971
[73] Assignee Rohr Corporation
Chula Vista, Calif.

[54] THRUST REVERSING APPARATUS FOR TURBO-FAN PROPULSION UNIT
4 Claims, 9 Drawing Figs.

[52] U.S. Cl.................................................. 60/226, 60/230
[51] Int. Cl..................................................... F02k 3/02
[50] Field of Search.......................................... 60/226, 228, 230, 231, 232, 233, 242, 224, 225

[56] References Cited
UNITED STATES PATENTS
3,261,164 7/1966 Tumicki....................... 60/226
3,262,270 7/1966 Beavers....................... 60/230 X
3,484,847 12/1969 Poole........................... 60/266

Primary Examiner—Clarence R. Gordon
Attorney—George E. Pearson

ABSTRACT: A cowling is spaced around housing of aircraft turbo-fan engine to define therewith an annular passage for flow of fan air to the atmosphere. Cascaded thrust reversing vanes are mounted at aft end of cowling and in cruise flight are covered by a sleeve attached to the cowling, the sleeve being movable rearwardly to thereby uncover the vanes when thrust reversal is required. In one embodiment of the invention a narrow, expandable diaphragm encircles the inner wall of the sleeve, and means are provided to expand this diaphragm radially inward and into abutment with the engine housing to thereby block the fan air passage and deflect fan air through the thrust-reversing vanes. In a second embodiment, the diaphragm is mounted on the engine housing and expands outward against the deployed sleeve to block the fan air passage. In a third embodiment both the sleeve and the engine housing are provided with diaphragms which abut when expanded radially of the fan air passage.

INVENTOR.
PETER H. ELLIS
ATTORNEY

INVENTOR.
PETER H. ELLIS
BY
Edwin D. Grant
ATTORNEY

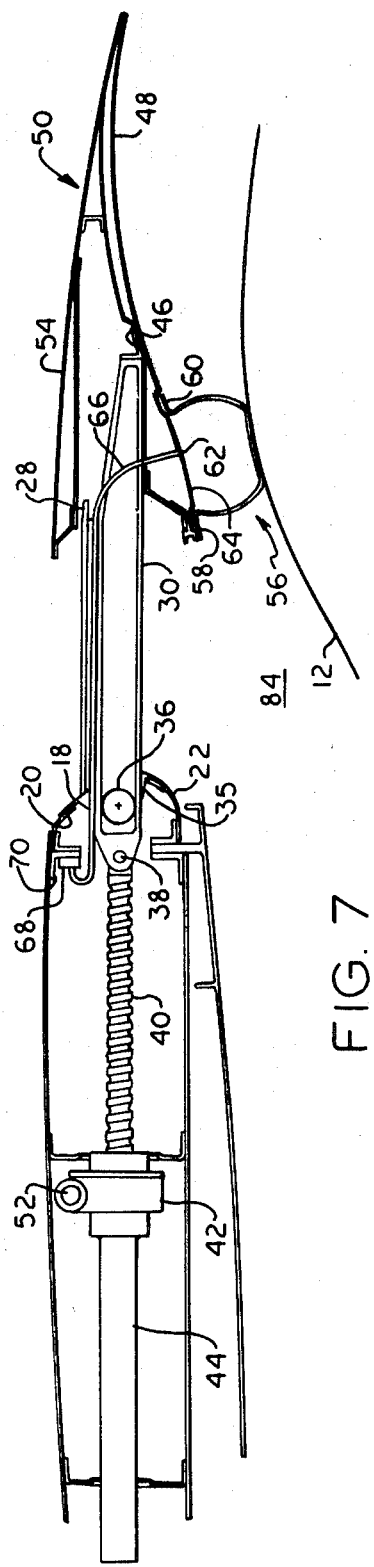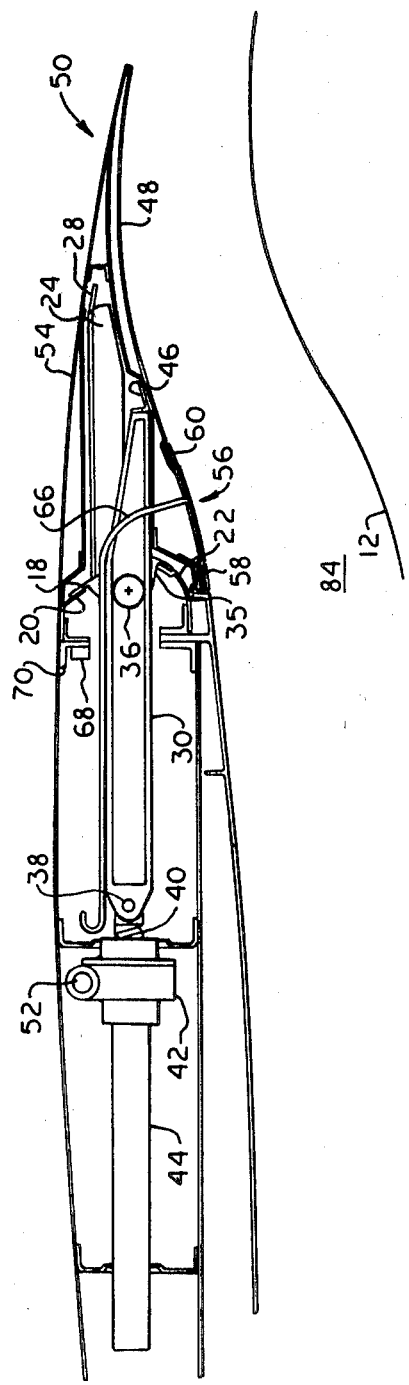

THRUST REVERSING APPARATUS FOR TURBO-FAN PROPULSION UNIT

SUMMARY OF THE INVENTION

This invention relates to thrust reversing apparatus for an aircraft and, more particularly, to a thrust reverser for a turbofan propulsion unit.

It has been proposed heretofore to effect thrust reversal in an aircraft turbofan propulsion unit by expanding an inflatable diaphragm across the fan air passage between the engine housing of such unit and the cowling which surrounds the housing, thereby blocking said passage and directing the engine fan air through cascaded thrust reversing vanes on the aft portion of the cowling. In the previously proposed apparatus the elastic diaphragm is mounted on the engine housing of the turbofan propulsion unit, and when thrust reversal is required it is expanded radially outward from said housing to bring an annular area thereof into abutment with the wall of the cowling aft of cascaded thrust-reversing vanes mounted in openings therein, at which point the fan air passage is relatively wide in order to provide for unrestricted flow of fan air when thrust reversal is not required. Such an arrangement requires a wide diaphragm, since the diaphragm would not otherwise be capable of expanding across the fan air passage while also forming a smooth continuation of the surface of the engine housing before it is inflated.

In accordance with one embodiment of the present invention, an inflatable diaphragm is attached to, and extends around, the inner wall of a sleeve which is mounted on the cowling of a turbofan propulsion unit of the type described above. The sleeve is movable between (1) a forward, stowed position wherein its inner and outer walls respectively cover opposite sides of cascaded thrust-reversing vanes mounted at the aft end of the cowling, and (2) a rearwardly translated, deployed position wherein the aforesaid diaphragm is disposed opposite a maximum diameter portion of the engine housing of the propulsion unit aft of the fixed cowling. When the sleeve is deployed fan air flows from the wide passage between the cowling and the engine housing into a narrow passage between the sleeve and said housing. Thus the diaphragm may be narrow while still being capable of (1) expanding across the fan air passage so as to block the same, and (2) forming a smooth continuation of the inner wall of the sleeve before being so expanded. In a second embodiment of the invention the diaphragm is mounted on the engine housing at its point of maximum diameter and expands outward against the translated sleeve to block the fan air passage. In a third embodiment both the sleeve and the engine housing are provided with diaphragms which abut medially of the fan air passage when expanded radially thereof.

DESCRIPTION OF THE DRAWINGS

FIGS. 6 and 7 are fragmentary longitudinal sectional views taken along the plane represented by the line designated 6 and 7 in FIG. 3 and in the direction indicated by arrows, the drawings also respectively illustrating the stowed and deployed positions of the aforesaid sleeve.

DETAILED DESCRIPTION

Figure 1:
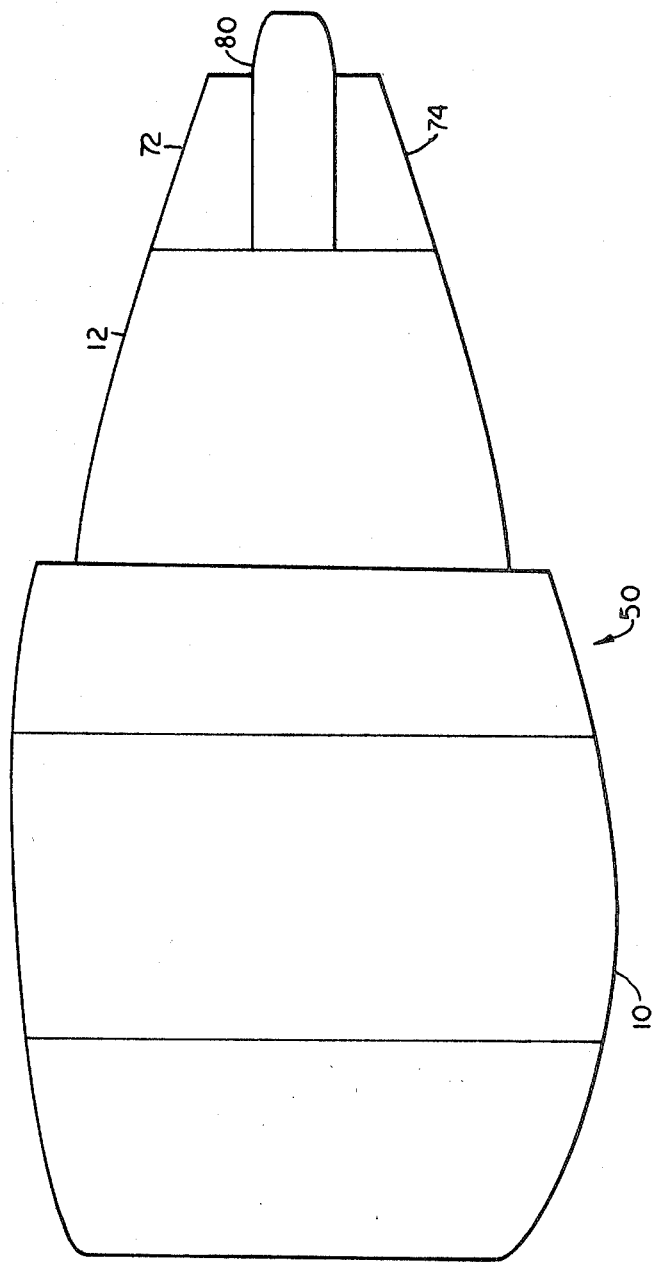
FIG. 1 is a side elevation of an aircraft turbofan propulsion unit equipped with thrust-reversing apparatus in accordance with the present invention.
Figure 2:
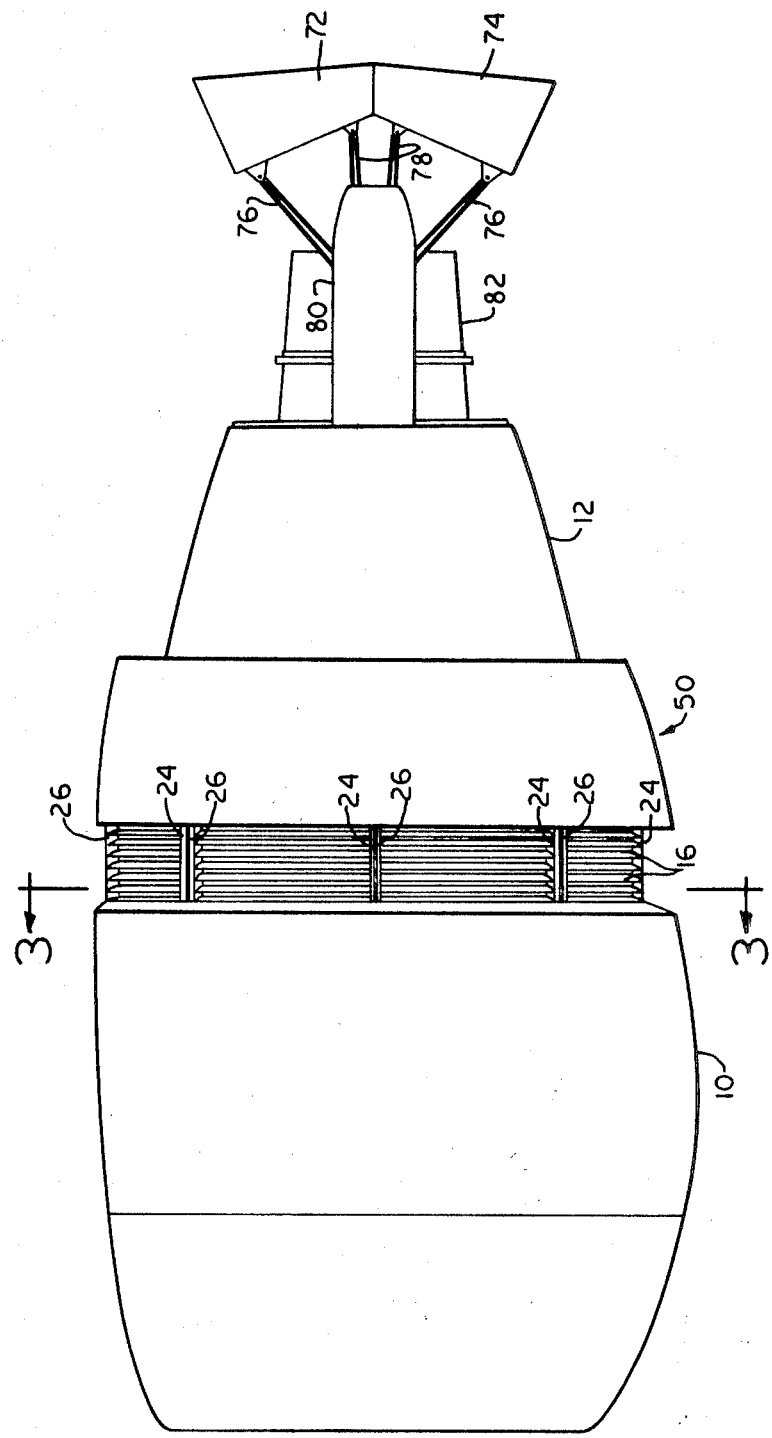
FIG. 2 is another side elevation of the same propulsion unit, illustrating its thrust-reversing apparatus in the deployed position.

In one preferred form of the invention which is illustrated in FIGS. 1—7, a tubular cowling 10 is disposed in spaced relation around the housing 12 of a turbofan engine 3 (illustrated by the dot-dash circle in FIG. 3), the cowling being mounted on a support member 14 which projects from one side of an aircraft fuselage and the housing being supported by the inner surface of the engine fan case. As illustrated in FIG. 2, cascades of thrust-reversing vanes 16 are fixedly mounted at the aft end of cowling 10 and extend circumferentially thereof. More particularly, the thrust-reversing vanes are cast in separate cascade sections each comprising a circumferentially extending forward wall member 18 (see FIGS. 4 and 5) the edges of which are respectively attached to sheet metal wall members 20, 22 of the aft edge of cowling, the ends of the forward walls of the cascade sections abutting one another around the cowling. Each cascade section also comprises a pair of sideplates 24, 26 (see FIG. 2) which are respectively joined to the ends of member 18 of the section and which project rearwardly in parallel relation with each other. The sideplates of the adjacent cascade sections abut each other, and the vanes of each section extend between the sideplates and are spaced apart axially of housing 12 downstream of the aft edge of the cowling, the rearmost vane being somewhat thicker than the other vanes. A tab 28 (see FIGS. 6 and 7) project rearwardly from each end of the rearmost vane in each cascade section, and the adjacent tabs overlap and are connected to each other. Vanes are arcuate in cross section and inclined forwardly (see FIGS. 4 and 5).

Figure 3:
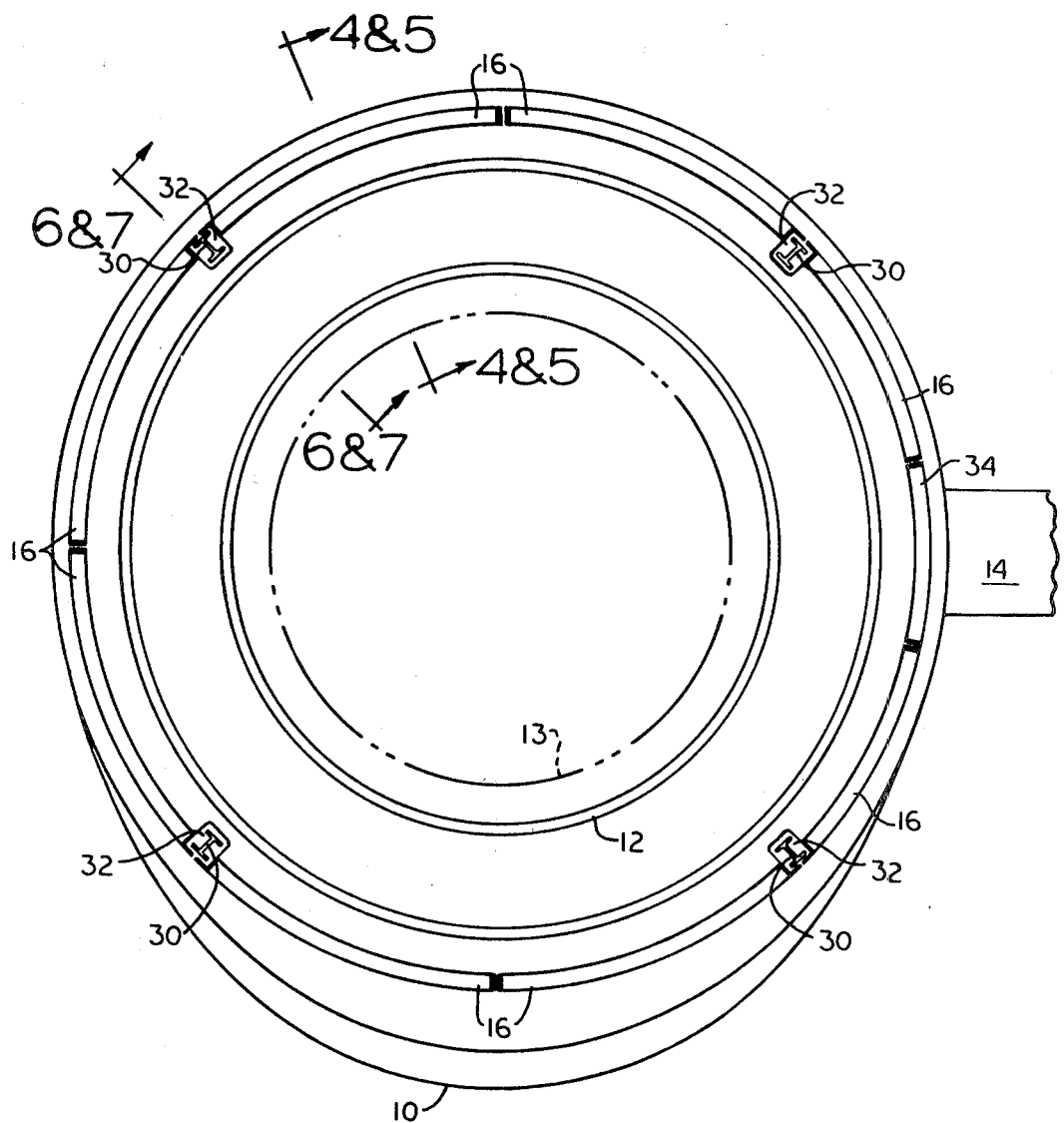
FIG. 3 is a cross-sectional view taken along the plane represented by line 3 in FIG. 2 and in the direction indicated by arrows.

As illustrated in FIG. 3, four rails 30 having an I-shaped cross section are evenly spaced apart circumferentially of the aft edge of cowling 10 and extend axially of the cowling through openings 32 in the wall formed at said aft edge by members 18, 20, 22. It will also be noted in the same drawing that these rails are respectively located between adjacent pairs of the aforesaid cascade sections and that a wall panel 34 is disposed between the pair of the cascade sections nearest support member 14, this panel serving to prevent flow of fan air from cowling 10 onto said support member when the described apparatus is operated in thrust reversal mode (which will be described hereinafter). A pair of lugs 35 (one of which is illustrated in FIGS. 6 and 7) are integrally joined to member 18 of each cascade section and projects forward to reform on opposite sides of a respective one of the rails 30, and mounted on each of these lugs is a roller 36 which engages the facing sides of the flanges of said rail. The forward end of each rail 30 is connected by means of a pin 38 to the rear end of a screw 40 which is substantially coaxial with the rail and rotatably mounted in a drive motor 42 and housing 44 assembly. The aft end of each rail is fastened to a bracket 46 fixed to the inner side of the inner wall 48 of an annular sleeve generally designated 50, said sleeve being disposed in spaced relation around housing 12. Thus when the four drive motors 42 are operated synchronously by an interconnected flexible cable 52 sleeve 50 is moved axially of the housing. Sleeve 50 also comprises an outer wall 54 the forward edge of which is substantially even with the forward edge of inner wall 48 but spaced outwardly therefrom, and the aft edge of which is joined to the aft edge of said inner wall. When the sleeve is in the stowed position illustrated in FIG. 6, its inner wall abuts member 22 of cowling 10 and covers the inner side of the cascade sections of which vanes 16 are a part, and its outer wall abuts member 20 of said cowling and covers the outer side of said cascade sections.

Designated generally in FIGS. 4—7 by reference number 56 is a diaphragm which extends circumferentially of inner wall 48. More specifically, this diaphragm is formed of a suitable elastic material such as rubber, and it is sealably attached at one edge 58 thereof to the forward edge of inner wall 48 and at the other edge 60 thereof to a recess which extends around said inner wall and is spaced a short distance rearwardly from its forward edge. An aperture 62 extends through the portion 64 of the inner wall which extends between the edges of diaphragm 56, and one end of a tube 66 is connected to said wall portion 64 so that its aperture is aligned with said aperture 62. The tube extends forwardly from sleeve 50 and along the outermost flange of one of the rails 30. However, the forward portion of said tube is curved so that its forward end is turned rearwardly. When the sleeve is moved to the deployed position illustrated in FIG. 7 the forward end of tube 66 enters an aperture in an air coupling 68 mounted to a structural member 70 of cowling 10. The air coupling is in turn connected to a source of compressed air through a pressure regulator (not shown). When the sleeve is returned to the stowed position, a valve in coupling 68 closes the aperture therein.

FIGS. 1 and 2 respectively illustrate the stowed and deployed positions of a pair of target-type thrust-reversing doors 72, 74 which are mounted by means of links 76, 78 to a pair of support walls 80 (only one of which is illustrated) projecting rearwardly from housing 10 on opposite sides of the thrust nozzle 82 of engine 13. Doors 72 and 74 are deployed by conventional means to their FIG. 2 position, whereupon they reverse the flow of thrust gas issuing from nozzle 82. Such doors and their associated drive mechanisms are of course well known in the art and do not constitute part of this invention, although they are simultaneously deployed with the previously described apparatus to effect thrust reversal of the propulsion unit.

Figure 8:
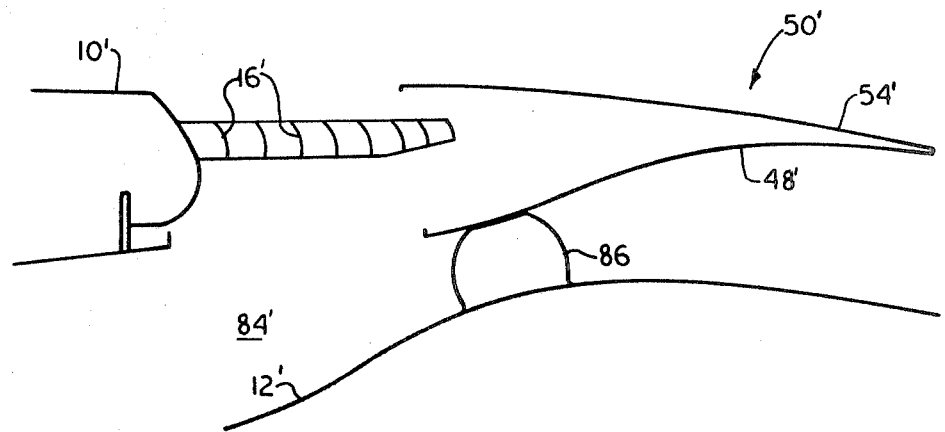
FIGS. 8 and 9 are diagrammatic, fragmentary longitudinal sectional views which respectively illustrate different embodiments of the invention.
Figure 9:
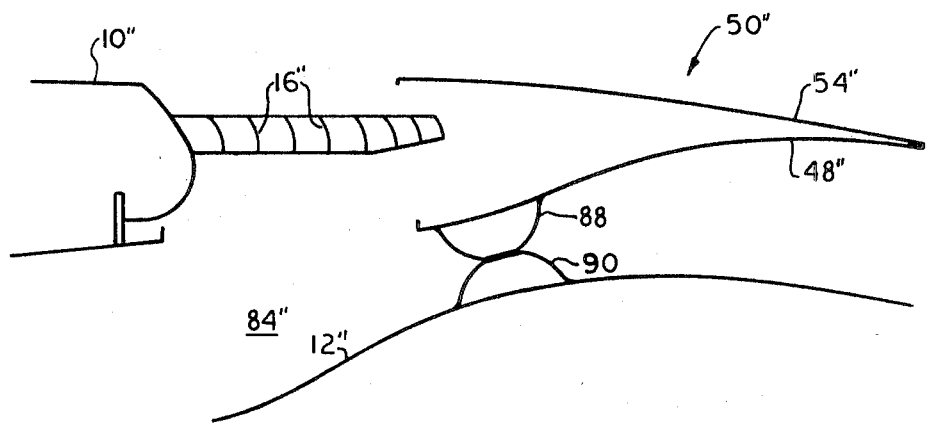

FIGS. 8 and 9 respectively illustrate two other embodiments of the invention which will be described after the following description of the operation of apparatus illustrated in the other drawings.

OPERATION

Figure 4:
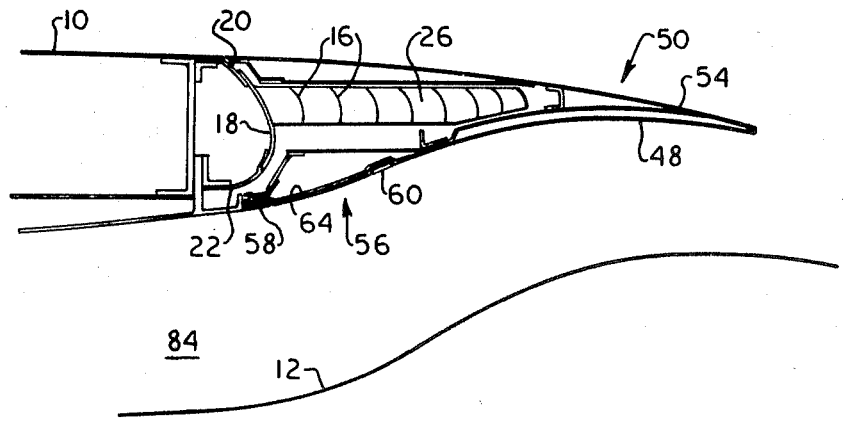
FIGS. 4 and 5 are fragmentary longitudinal sectional views taken along the plane represented by the line designated 4 and 5 in FIG. 3 and in the direction indicated by arrows, the drawings respectively illustrating the stowed and deployed positions of a translatable sleeve.
Figure 5:
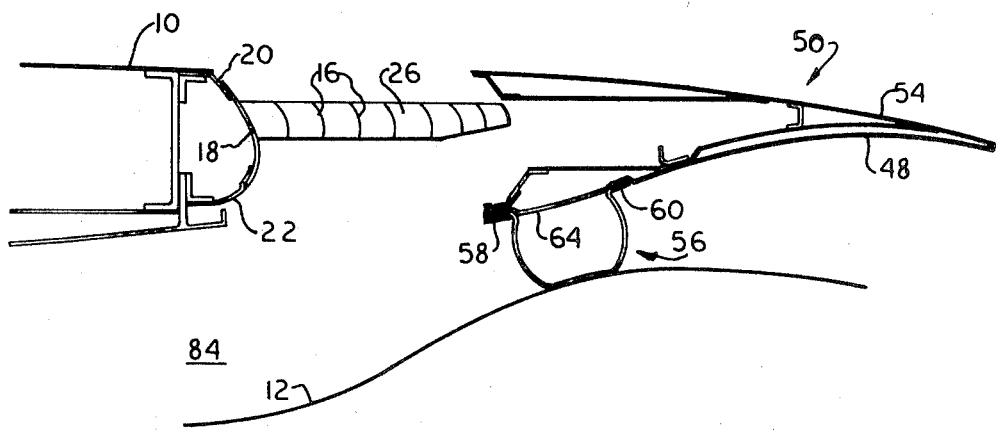

Except when thrust reversal is required, sleeve 50 covers both sides of vanes 16, as illustrated in FIGS. 1, 4 and 6, and fan air flows through the annular passage 84 disposed between housing 12 and the tube which is formed by cowling 10 and said sleeve. To reverse the thrust of the propulsion unit, motors 42 are simultaneously operated to rotate screws 40 and extend them rearwardly until diaphragm 56 is positioned near the maximum diameter portion of housing 12. Vanes 16 are thus uncovered, the forward end of tube 66 is inserted into the aperture in coupling 68, compressed air flows through said tube and through the aperture 62 in the inner wall of sleeve 50, and diaphragm 56 is expanded radially across the fan air passage and into abutment with housing 12 (FIGS. 5 and 7). Preferably bleed air from engine 13 is supplied to coupling 68 through the pressure regulator connected thereto, and the latter is set so that flow of air to the expanded diaphragm is stopped when the pressure therein reaches a predetermined level. The inflated diaphragm causes fan air to flow between vanes 16, which turn said air forwardly to reverse the direction of its thrust. Doors 72 and 74 are deployed at the same time the diaphragm is expanded, thereby also reversing the direction of thrust of the gas stream discharged from nozzle 82. When thrust reversal is no longer required, air pressure within the expanded diaphragm is relieved through tube 30, and when sleeve 50 is translated forward said tube is disconnected from coupling 68. Doors 72 and 74 are simultaneously retracted into abutment with support walls 80.

In the aforementioned arrangement wherein fan air flow of a turbofan propulsion unit is reversed by means of an expandable diaphragm mounted on a turbofan engine housing such as housing 12 and wherein there is no translatable sleeve 50, the diaphragm must be capable of expanding across the full width of the fan air passage 84 which is illustrated in FIGS. 4 and 6. Thus the diaphragm must necessarily extend for a considerably distance axially of said housing 12, as discussed hereinbefore. However, the gap between the maximum diameter portion of housing 12 and the translated sleeve 50 of the disclosed thrust-reversing apparatus is relatively narrow, as can readily be seen in FIGS. 5 and 7, and consequently diaphragm 56 does not have to be wide in order to be capable of blocking the fan air passage. The arrangement of the thrust-reversing apparatus of FIGS. 1—7 is less complicated and lighter than conventional fan air thrust-reversing equipment of the type wherein a plurality of vanes are swung across a fan air passage 84 to thereby direct fan air between cascades of thrust-reversing vanes. The arrangement of the disclosed thrust reversing apparatus also eliminates the aerodynamic drag resulting from the flow of fan air past actuating links which in some vane type fan air thrust reversers are not fully retracted from passage 84 when the blocker vanes are in the stowed position. Furthermore, since diaphragm 56 of the disclosed apparatus is much narrower than a diaphragm which is mounted on a housing 12 and expanded across a relatively wide portion of the fan air passage 84, the present invention provides the advantage of permitting greater coverage of the wall of said passage with sound suppression material.

In a second embodiment of the invention which is illustrated in FIG. 8, a sleeve 50' is mounted on a cowling 10' which surrounds the forward portion of a turbofan engine housing and defines therewith a passage 84' for discharge of fan air. Like sleeve 50, the sleeve of the second embodiment is translatable between (1) a stowed position wherein the forward edges of its inner and outer walls 48', 54' abut the aft end of cowling 10' and (2) the illustrated deployed position wherein it is moved downstream from the aft end of said cowling so as to uncover cascades of thrust reversing vanes 16' mounted on the latter. There is a narrow gap between the forward portion of the inner wall of sleeve 50' and the increased diameter portion of housing 12', and a narrow, inflatable diaphragm 86 is attached at its edges to said housing. When diaphragm 86 is expanded it blocks the aforesaid gap as illustrated in the drawing. Hence the arrangement of the second embodiment provides the same advantages which are achieved by the apparatus illustrated in FIGS. 1—7. In the third embodiment of the invention which is illustrated in FIG. 9, reference numbers having double prime marks are used to designate components which correspond to components of the first described embodiment designated by the same numbers without prime marks. In this embodiment an expandable diaphragm 88 is attached to the forward portion of the inner wall 48'' of sleeve 50'', and a second expandable diaphragm 90 is attached to the maximum diameter portion of housing. The two diaphragms abut each other medially of the fan air passage when thrust reversal is required.

Various modifications can obviously be made in the construction and arrangement of the disclosed embodiments of the invention without departing from the basic principles of their operation. The scope of the invention should therefore be considered to be limited only by the terms of the appended claims.

What I claim is:

1. In a jet propulsion assembly wherein a tubular cowling is spaced around the housing of a turbofan jet engine to provide therebetween an annular passage through which fan air is discharged and wherein said housing has a maximum diameter aft of said cowling, thrust-reversing apparatus comprising:

a plurality of thrust-reversing vanes fixedly attached to the aft edge of said cowling and extending circumferentially thereof, said vanes being inclined in the forward direction and spaced apart axially of said housing downstream from said cowling aft edge;

an annular sleeve mounted on said cowling and having inner and outer walls which respectively cover opposite sides of said thrust-reversing vanes when said sleeve is in a stowed position wherein the forward edges of said walls are adjacent the aft edge of said cowling, said sleeve being movable to a deployed position downstream from said cowling wherein the forward portion of its inner wall is spaced relatively close to said housing near the maximum diameter portion thereof;

means operatively associated with said sleeve for moving it between said stowed and deployed positions;

an elastic diaphragm mounted on one of the outer side of said housing and the inner wall of said sleeve and extending circumferentially thereof, said diaphragm being expandable radially of the gap between said sleeve and said housing near the maximum diameter portion of said housing when said sleeve is in said deployed position, thereby to block said gap and deflect said fan air between said vanes; and means operatively associated with said diaphragm for expanding it at a selected time.

2. Apparatus as defined in claim 1, wherein said diaphragm is mounted on the inner wall of said sleeve.

3. Apparatus as defined in claim 1, wherein said diaphragm is mounted on said housing at the maximum diameter portion thereof.

4. Apparatus as defined in claim 1, wherein said diaphragm is mounted on the inner wall of said sleeve and including a second elastic diaphragm mounted on said housing near the maximum diameter portion thereof and means operatively associated with said second diaphragm for expanding it radially of said gap at a selected time.